United States Patent
Suzuki

(10) Patent No.: US 7,131,573 B2
(45) Date of Patent: Nov. 7, 2006

(54) MERCHANDISE SALES DATA PROCESSING APPARATUS

(75) Inventor: Shigeaki Suzuki, Izu (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 100 days.

(21) Appl. No.: 10/918,923

(22) Filed: Aug. 16, 2004

(65) Prior Publication Data

US 2005/0051618 A1 Mar. 10, 2005

(30) Foreign Application Priority Data

Aug. 22, 2003 (JP) ............................ 2003-298599

(51) Int. Cl.
G06F 17/00 (2006.01)
G06K 15/00 (2006.01)
G06Q 20/00 (2006.01)
A63F 9/02 (2006.01)

(52) U.S. Cl. ...................... 235/375; 235/378; 705/16; 186/59; 186/61

(58) Field of Classification Search ............... 235/375, 235/378; 705/16; 186/59, 61
See application file for complete search history.

(56) References Cited

U.S. PATENT DOCUMENTS

| | | | | |
|---|---|---|---|---|
| 3,608,690 A | * | 9/1971 | Morrow et al. ............. | 194/206 |
| 3,654,433 A | * | 4/1972 | Mendoza ..................... | 235/7 A |
| 4,463,446 A | * | 7/1984 | Shah et al. .................... | 340/5.9 |
| 4,532,641 A | * | 7/1985 | Nishimura ................... | 377/14 |
| 4,752,874 A | | 6/1988 | Meyers | |
| 4,817,041 A | * | 3/1989 | Sakamoto .................... | 705/16 |
| 5,227,966 A | * | 7/1993 | Ichiba ........................ | 705/16 |
| 5,366,404 A | * | 11/1994 | Jones ............................ | 453/2 |
| 5,598,332 A | * | 1/1997 | Wakabayashi ............... | 705/24 |
| 5,615,759 A | * | 4/1997 | Cadbury ..................... | 194/206 |
| 5,710,415 A | * | 1/1998 | Kono et al. ................. | 235/7 R |
| 6,550,671 B1 | * | 4/2003 | Brown et al. ............... | 235/379 |
| 6,795,809 B1 | * | 9/2004 | O'Brien et al. .............. | 705/16 |
| 6,934,688 B1 | * | 8/2005 | Carter ......................... | 705/11 |
| 6,981,633 B1 | * | 1/2006 | Inoue et al. ................. | 235/7 R |
| 2002/0030101 A1 | * | 3/2002 | Inoue et al. ................. | 235/381 |
| 2003/0135406 A1 | * | 7/2003 | Rowe .......................... | 705/11 |
| 2004/0193498 A1 | * | 9/2004 | Fujimoto ..................... | 705/16 |
| 2005/0035188 A1 | * | 2/2005 | Carter ......................... | 235/7 R |
| 2005/0051618 A1 | * | 3/2005 | Suzuki ........................ | 235/379 |
| 2005/0075935 A1 | * | 4/2005 | Walker et al. ............... | 705/16 |
| 2005/0150946 A1 | * | 7/2005 | Miodunski et al. ......... | 235/379 |

FOREIGN PATENT DOCUMENTS

| | | | |
|---|---|---|---|
| JP | 407230581 A | * | 8/1995 |
| JP | 10-198866 A | | 7/1998 |
| JP | 02005071015 A | * | 3/2006 |

* cited by examiner

*Primary Examiner*—Daniel Walsh
(74) *Attorney, Agent, or Firm*—Frishauf, Holtz, Goodman & Chick, P.C.

(57) ABSTRACT

A merchandise sales processing apparatus communicates with a money changer machine for automatically dispensing cash, acquires a sales figure in a transaction, acquires a differential amount in the money changer occurred in the transaction from the money changer, decides if the acquired sales figure matches the acquired price of the fluctuating currency, and acquires a transaction date and time on the transaction if the sales figure does not match the differential amount, and stores the transaction date and time in the memory.

19 Claims, 9 Drawing Sheets

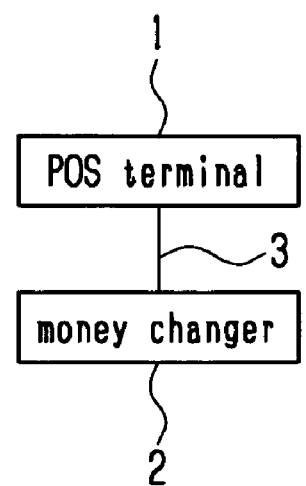
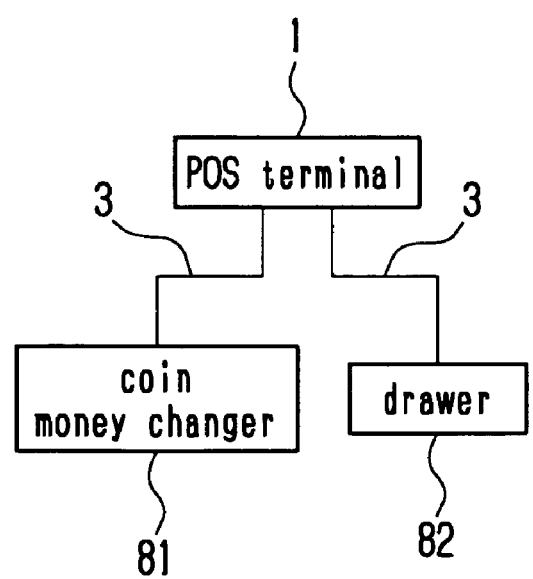

Fig. 4

| pre-credit balance | post-credit balance | differential amount | sales amount |
|---|---|---|---|
| 51 | 52 | 53 | 54 |

Fig. 5

| transaction date and time | transaction number | cashier ID | pre-credit balance | post-credit balance | differential amount | sales amount |
|---|---|---|---|---|---|---|
| 61 | 62 | 63 | 64 | 65 | 66 | 67 |

F2

MERCHANDISE SALES DATA PROCESSING APPARATUS

CROSS REFERENCE TO RELATED APPLICATION

The present application is based on Japanese Priority Document P2003-298599 filed on Aug. 22, 2003, the content of which is incorporated herein by reference.

BACKGROUND OF THE INVENTION

1. Field of the Invention

The present invention relates to a merchandise sales data processing apparatus such as an electronic cash register or a POS (Point Of Sales) terminal, and more particularly to a merchandise sales data processing apparatus connected to a money changer.

2. Discussion of the Background

A system where a POS terminal is connected to a money changer is known in the related art. In this system at the close of a transaction, the POS terminal calculates a change (money remaining from the transaction) by subtracting the purchase price from an amount of deposited money. And the POS terminal sends data showing the amount of resulting change to the money changer. Then, the money changer automatically dispenses money equal to that amount of change. Thus, a cashier inserts the money paid by a customer into the money changer in the transaction, and hands the money dispensed from the money changer along with a receipt to the customer. The money paid by the customer is in this way re-circulated as change money. The money is therefore stored within a section of the money changer except when being exchanged between the customer and cashier and therefore cannot be removed unless the cover of the money changer is opened with a key. The above system in this way prevents crimes such as cash robberies.

However, the above system does allow illegal actions such as the cashier appropriating money received from the customer instead of inserting the money into the money changer. To prevent such illegal actions, an apparatus for checking which cashier performed an illegal transaction is disclosed in JP-A No.198866/1998.

In the money changer, the differential amount between credit amount and disbursement amount usually matches the sales price. However, problems may occur where these figures do not match for some reason. One cause might be illegal actions by the cashier as described above. Other causes might for example include entering the wrong figure as the deposit amount, or loosing the deposit money due to the cashier dropping it on the floor when attempting to insert the deposit money into the money changer, etc.

To solve the problem of the differential between the credit amount and disbursement amount in the money changer not matching the sales amount, it is important to analyze the cause of the problem. The technique disclosed in JP-A No.198866/1998 allows determining which cashier caused the problem. However, analyzing the causes of the problem even just this information was difficult.

SUMMARY OF THE INVENTION

Accordingly, the present invention has an object of analyzing the cause of the problem of the differential between the credit amount and disbursement amount in the money changer not matching the sales amount.

The object of the present invention is achieved by a novel merchandise sales data processing apparatus.

According to the novel merchandise sales data processing apparatus of the present invention comprises: a portion for executing merchandise sales processing; a portion for executing data communication with a money changer which automatically dispenses change; a portion for obtaining a sales amount in the sales processing executed in a transaction; a portion for obtaining a differential amount in the money changer occurred in the transaction based on information obtained by the data communication with the money changer; a portion for obtaining determination whether or not the obtained sales amount and the obtained differential amount match each other; and a portion for acquiring a transaction date and time on the transaction and storing the transaction date and time into a memory if the determination results show that the sales amount and the differential amount do not match each other.

Another aspect of the novel merchandise sales data processing apparatus of the present invention comprises: a portion for executing merchandise sales processing; a portion for executing data communication with a money changer which automatically dispenses change; a portion for entering a deposit amount in the transaction; a portion for obtaining a credit amount to the money changer in the transaction based on information acquired by the data communication with the money changer; a portion for obtaining a determination whether or not the input deposit amount and the obtained credit amount match each other; and a portion for acquiring a transaction date and time, and storing the transaction date and time into a memory if the determination results show that the deposit amount and the credit amount do not match each other.

BRIEF DESCRIPTION OF THE DRAWINGS

A more complete appreciation of the present invention and the attendant advantages thereof will be readily obtained as the same becomes better understood by reference to the following detailed description when considered in connection with the accompanying drawings, wherein:

FIG. 1 is a block diagram showing an example of a system according to an embodiment of the present invention;

FIG. 4 is a table showing the structure of a balance/sales file;

FIG. 5 is a table showing the structure of a money reception error management file;

FIG. 7 is a block diagram showing another example of the system;

DETAILED DESCRIPTION OF THE PREFERRED EMBODIMENTS

A preferred embodiment of the present invention will now be described in detail in accordance with FIG. 1 through FIG. 10.

FIG. 1 is a block diagram showing a system of the embodiment of the present invention. As shown in FIG. 1, in the system, a POS terminal 1 as a merchandise sales data processing apparatus is connected via a communication cable 3 to a money changer 2.

Figure 2:
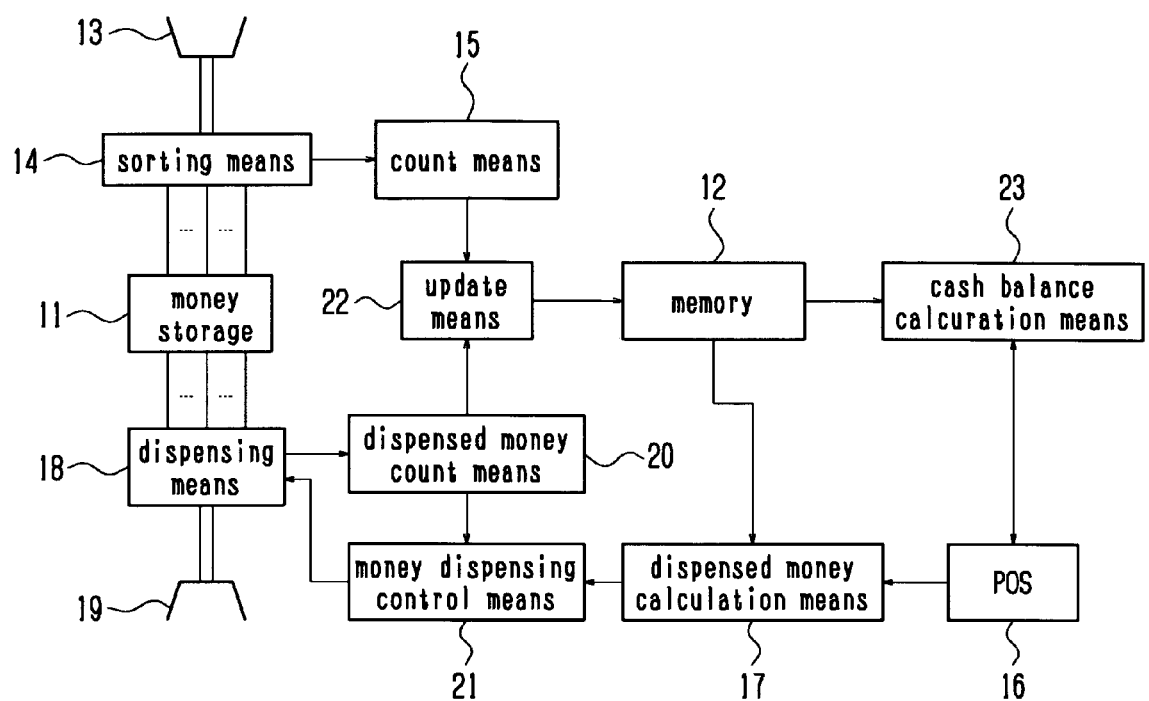
FIG. 2 is a functional block diagram showing a money changer.

FIG. 2 is a functional block diagram showing the money changer 2. The money changer 2 handles bank bills and coins as currency. As shown in FIG. 2, the money changer 2 has a money storage 11 which holds bank bills and coins according to the currency denomination, a memory 12 for holding the number of bills of each currency denomination stored in the money storage 11, a money entry slot 13 to which bank bills and coins are input as payment from a customer or change money, a sorting means 14 for sorting money inserted from the money entry slot 13 (credit) by currency denomination and storing into the money storage 11, and a count means 15 for counting the number of bills of each currency denomination sorted by the sorting means 14.

The money changer 2 further comprises a POS interface 16 to receive change data sent from the POS terminal 1, a dispensed money calculation means 17 which calculates the number of bills or coins of each currency denomination based on change data received via the POS interface 16 and data on the number of bills or coins of each currency denomination stored in the memory 12, a dispensing means 18 for dispensing one at a time each currency denomination stored in the money storage 11, a change dispensing slot 19 for receiving money dispensed by the money dispensing means 18 from the money storage 11, a dispensed money count means 20 for counting the number of each currency denomination dispensed by the money dispensing means 18, a money dispensing control means 21 for operating the money dispensing means 18 to dispense money until the number of each denomination of dispensed money counted by the dispensed money count means 20 matches the number of each currency denomination calculated by the dispensed money calculation means 17, and an update means 22 for updating the value in the memory 12 based on the number of each currency denomination of the inserted money counted by the count means 15 and the number of each denomination of dispensed money counted by the dispensed money count means 20.

The money changer 2 further comprises a cash balance calculation means 23 for reading the number bills and coins of each currency denomination data stored in the memory 12 and calculating the current balance when a balance request command is received via the POS interface 16, and sends the current balance via the POS interface 16 to the POS terminal 1.

Figure 3:
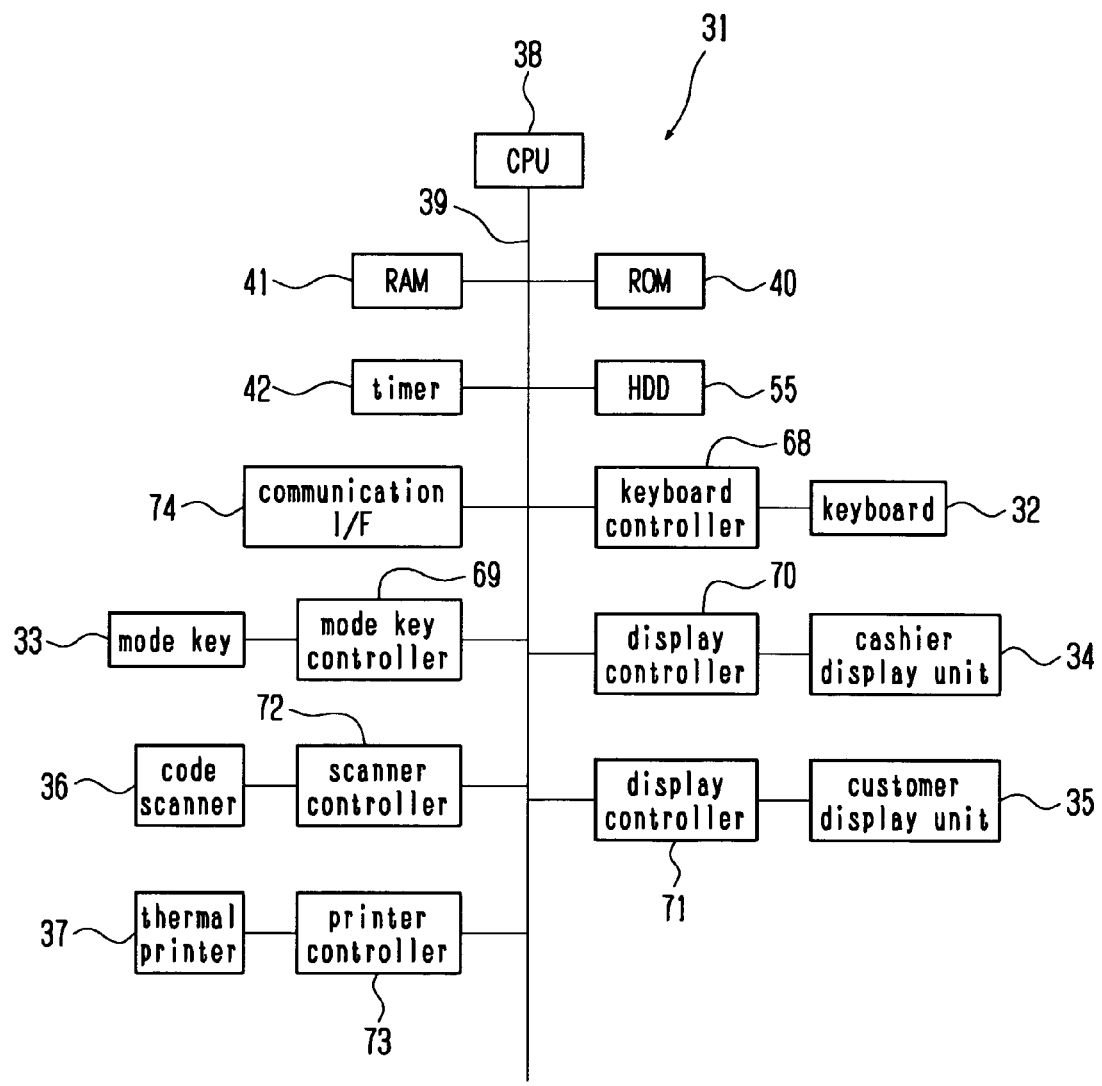
FIG. 3 is a block diagram showing a POS terminal.

FIG. 3 is a block diagram showing the POS terminal 1. As shown in FIG. 3, the POS terminal 1 contains a microcomputer 31, a keyboard 32 as an input means, a mode key 33, a cashier display unit 34, a customer display unit 35, a code scanner 36, and a thermal printer 37, etc.

In the microcomputer 31, a CPU (Central Processing Unit) 38 for central control of the respective units is connected via a bus line 39 such as an address bus or a data bus, with a ROM (Read Only Memory) 40 holding previously stored fixed data such as a startup program, a RAM (Random Access Memory) 41 including various buffers such as a sales buffer and a print buffer for storing different types of rewritable data, and a timer 42 for calculating the date and time. The RAM 41 is backed up by a battery (not shown).

FIG. 4 is a table showing the structure of the balance/sales file F1. The balance/sales file F1 as shown in FIG. 4 is created in the RAM 41 for sales processing described later on. The balance/sales file F1 has a pre-credit balance area 51 for storing the money changer 2 pre-credit balance of the transaction, a post-credit balance area 52 for storing the money changer 2 transaction post-credit balance, a differential amount area 53 for storing the money changer 2 differential amount of the transaction, and a sales amount area 54 for storing the sales amount of the transaction.

As shown in FIG. 3, a HDD (Hard Disk Drive) 55 is connected as a storage section to the CPU 38 by a bus line 39. Data files of different types as well as a computer program to operate the microcomputer 31 are stored in the HDD 55. Among the different data files are a merchandise master file (not shown) which holds merchandise names and unit prices associated with merchandise codes, a journal file (not shown) which holds sales details such as sales data and journal data such as the sales amounts linked to the transaction numbers, and a money reception error management file F2 as shown in FIG. 5.

FIG. 5 is a table showing the structure of the money reception error management file F2. The money reception error management file F2 holds information relating to a transaction where a money receiving error occurred in the money changer 2. As shown in FIG. 5, the money reception error management file F2 has a transaction date and time area 61 in which the date and time of the transaction having the money receiving error are stored, a transaction number area 62 in which the transaction number is stored, a cashier ID area 63 in which a cashier ID for specifying the cashier is stored, a pre-credit balance area 64 in which a pre-credit balance in the money changer 2 for the transaction is stored, a post-credit balance area 65 in which the post-credit balance in the money changer 2 for the transaction is stored, a differential amount area 66 in which a differential amount in the money changer 2 for the transaction is stored, and a sales amount area 67 in which the sales amount for the transaction is stored. Note that the transaction date and time is information for specifying the transaction.

The computer program stored in the HDD 55 is written, with various files such as the merchandise master file into the RAM 41 upon start-up of the POS terminal 1, and the respective units can therefore be controlled by the microcomputer 31.

The respective units controlled by the microcomputer 31 will next be described while referring to. FIG. 3.

The keyboard 32 includes different keys such as numeric keys, a PLU key, a section key, a subtotal key, a deposit/current sum key and a clear key. The keyboard 32 is connected via a keyboard controller 68 to the bus line 39, and a signal for the corresponding depressed key is input to the microcomputer 31 by the operation of the keyboard controller 68.

A mode key 33 is connected via a mode key controller 69 to the bus line 39, and a signal corresponding to the selection position is input to the microcomputer 31 by an operation of the mode key controller 69. The microcomputer 31 sets the operation mode of the POS terminal 1 to a registration mode, a setting mode, a checkout mode or an inspection mode.

The cashier display unit 34 and the customer display unit 35 are connected via display controllers 70 and 71 to the bus line 39. When display data from the microcomputer 31 is input to the display controller 70 and.71, these display units show predetermined items under the control of the display controllers 70 and 71.

The code scanner 36 optically scans the merchandise code such as a bar code. The code scanner 36 is connected via a scanner controller 72 to the bus line 39. The scanner controller 72 transmits the scanned merchandise code data to the microcomputer 31.

The thermal printer 37 is connected via a printer controller 73 to the bus line 39, and is controlled by the microcomputer 31. The thermal printer 37 further includes a cutter (not shown) which is driven and controlled by the microcomputer 31. The thermal printer 37 functions such that the necessary items are printed as a receipt on a receipt paper which is a long sheet (not shown) and the paper is cut and issued as a receipt.

In the POS terminal 1, a communication interface 74 is connected by the bus line 39 via the communication cable 3 to the money changer 2 for exchanging data with the money changer 2, and is controlled by the microcomputer 31.

Figure 6:
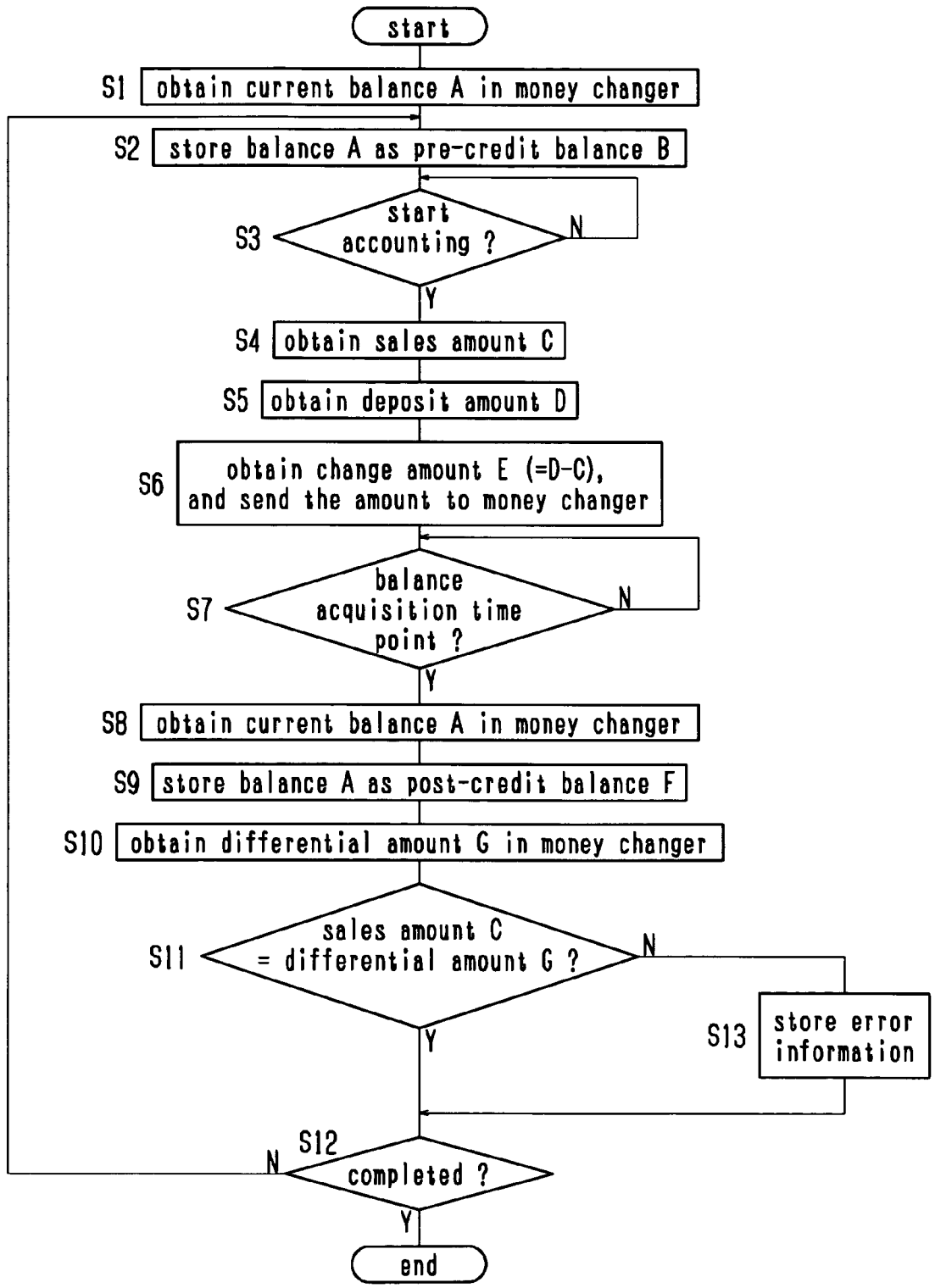
FIG. 6 is a flowchart showing an example of the sales processing flow.

FIG. 6 is a flowchart showing an example of the flow of sales processing. The sales processing performed by the CPU 38 in accordance with the computer program will be described while referring to the flowchart in FIG. 6. The sales processing is executed in registration mode. To perform a registration operation in registration mode, the cashier enters the cashier ID. In registration mode, a cashier ID area to store the cashier ID is formed in the RAM 41, and the input cashier ID is stored in the cashier ID area.

First, as shown in FIG. 6, when the registration mode is selected, the balance/sales file F1 as shown in FIG. 4 is formed in the RAM 4, and the current balance in the money changer 2 (hereinafter, balance A) is obtained (step S1). More specifically, a request command requesting transmission of balance A is sent to the money changer 2. The current balance A then sent from the money changer 2 is received. Upon being received, the balance A in the money changer 2 is stored as a pre-credit balance (hereinafter, pre-credit balance B) in the pre-credit balance area 51 of the balance/sales file F1 (step S2).

The process is then in standby until an accounting operation starts (step S3). The accounting operation is, for example, the scanning and inputting of the merchandise code with the code scanner 36. When the scanned-input of merchandise code with the code scanner 36 has then been performed, the merchandise master file is searched based on the scanned-input merchandise code, the merchandise name and a unit price corresponding to the merchandise code are read (scanned), and the sale is registered based on the merchandise code, the read merchandise name and the unit price. This processing is repeated until the subtotal key is depressed. In response to the depression of the subtotal key, the sales amount of the transaction (hereinafter, sales amount C) is then calculated and obtained (step S4). More specifically, the sales amount is stored in the sales amount area 54 of the balance/sales file F1.

Next, when a closing declaration indicating registration of commodities purchased by the customer has been completed and that the customer has paid in cash is detected by the pressing of the deposit/current sum key, the deposit amount from the customer (hereinafter, deposit amount D) input by numeric keys on keyboard 32 is obtained (step S5), the sales amount C is then subtracted from the deposit amount D to obtain a change amount E, and the change data is transmitted to the money changer 2 (step S6). The thermal printer 37 then prints and issues a receipt, and the recording of the journal in the journal file is performed.

The money changer 2 receives the change data from the POS terminal 1, and dispenses change based on this change data.

The process is then in standby until a balance acquisition time point in the money changer 2 (N at step S7) is reached.

The balance acquisition time point determines the point at which the balance A in the money changer 2 is obtained again upon termination of transaction. The balance acquisition time point is for example, a point at which the accounting start operation is performed in the next transaction (transaction subsequent to the present transaction). As another example, the balance acquisition time point may be a point after a predetermined period from the closing declaration at step S5. In this case, if the accounting start operation of the next transaction is performed within the predetermined period after the closing declaration at step S5, then the time that the accounting start operation is performed becomes the balance acquisition time point without waiting for the predetermined period. The cashier inputs deposit money from a customer into the money changer by the balance acquisition time point.

In the case where the accounting start operation of the next transaction has been detected or it is determined that the predetermined period has elapsed from the closing declaration and the balance acquisition time point has been reached (Y at step S7), the balance A in the money changer 2 at this point is obtained (step S8). More particularly, as in the case of step S2, a request command requesting transmission of the current balance A is sent to the money changer 2. The current balance A sent from the money changer 2 is received. The balance A in the money changer 2 upon being received is stored as a post-credit balance (hereafter, post-credit balance F) into the post-credit balance area 52 of the balance/sales file F1 (step S9).

Next, the pre-credit balance B is subtracted from the post-credit balance F to obtain a differential amount in balance amount (hereafter, differential amount G) in the money changer 2 in the present transaction. The differential amount is stored in the differential amount area 53 of the balance/sales file F1 (step S10). The differential amount G in the money changer 2 in the current transaction and the sales amount C are then compared with each other and it is determined whether or not the amounts correspond to each other (step S11, determination means). At this time, if all deposit money has been inserted into the money changer 2, the differential amount G and the sales amount C are the same.

At step S11, if determined that the differential amount G and the sales amount C match each other (Y at step S11), since there is no problem in the money receiving operation, the process then proceeds to step S12.

If determined at step S11 that the differential amount G and the sales C do not match each other (N at step S11), since there is a problem in the money receiving operation, then the date and time of the transaction, the transaction number, the cashier ID, the pre-credit balance B, the post-credit balance F, the differential amount G and the sales amount C are stored as error information in the respective areas 61 to 67 of the money reception error management file F2 (step S13). The storage of data in the money reception error management file F2 therefore indicates from the determination results that the differential amount G and the sales amount C do not match each other. Thereafter, the process proceeds to step S12.

At step S12, it is determined whether or not the registration mode has been terminated, and if the registration mode has been terminated (Y at step S12), then the process ends, while if not terminated (N at step S12), the process returns to step S2 to perform the sales processing in the next transaction. It should be noted that at step S2, the most recently obtained balance A in the money changer 2 is stored as the pre-credit balance B. In this case, the balance A obtained at step S8 and handled as the post-credit balance F at step S9 is stored as the pre-credit balance B into the pre-credit balance area 51 of the balance/sales file F1.

As a method of obtaining the differential amount G in the money changer 2 at step S10, the subtraction of the pre-credit balance amount B from the post-credit balance amount F may be replaced by subtracting the change amount E from the actual credit amount (hereafter, credit amount H) into the money changer 2 calculated in the change amount 2 obtained from the money changer 2.

In the present embodiment, information relating to a transaction where the sales amount C and the differential amount G in the money changer 2 do not match each other such as information on a transaction with a money receiving problem, is stored while linked with transaction date and time into the money reception error management file F2, so that the time at which the money receiving error occurred can be specified. The cause of the money receiving error can be found for example by checking the transaction at that time captured by a surveillance camera installed in the shop. Possible causes of money receiving errors include the cashier theft by misappropriating deposit money, erroneous input of deposit amount, the cashier dropping the money to the floor after inserting the deposit money into the money changer 2, etc.

Since the date and time of the transaction can be specified, the status of the transaction, such as the shop being crowded or not can be found. Situations where money receiving errors occur can therefore be analyzed.

Since the cause of money receiving error can be correctly analyzed, the cashier can be prevented from being falsely charged with theft.

Since this money receiving error check is performed at each transaction, the cashier knows it is impossible to misappropriate deposit money from a customer and this type of fraud can therefore be prevented.

In the present embodiment, the differential amount can be easily obtained by subtracting the pre-credit balance B from the post-credit balance F in the money changer 2.

In the present embodiment, a single money changer to handle bank bills and coins was described as the money changer connected to the POS terminal 1. However, two money changers to respectively handle bank bills and coins may be connected to the POS terminal 1.

FIG. 7 is a block diagram showing another example of the system according to the present embodiment. The system in FIG. 7 has a coin money changer to handle only coins. Accordingly, in the system in FIG. 7, a coin money changer 81 and a drawer 82 to hold bank bills are connected via the communication cable 3 to the POS terminal 1. The coin money changer 81 lacks the sections relating to bank bills in the above-described money changer 2, but other sections are the same as those in the money changer 2. The drawer 82 opens/closes a drawer (not shown) as a bank bill storage section under control of the POS terminal 1. The drawer 82 does not manage the balance inside the drawer. In this case, the balance in the drawer 82 cannot be managed by the POS terminal 1. The POS terminal 1 therefore checks for the presence/absence of money receiving errors only for coins handled by the coin money changer 81.

Figure 8:
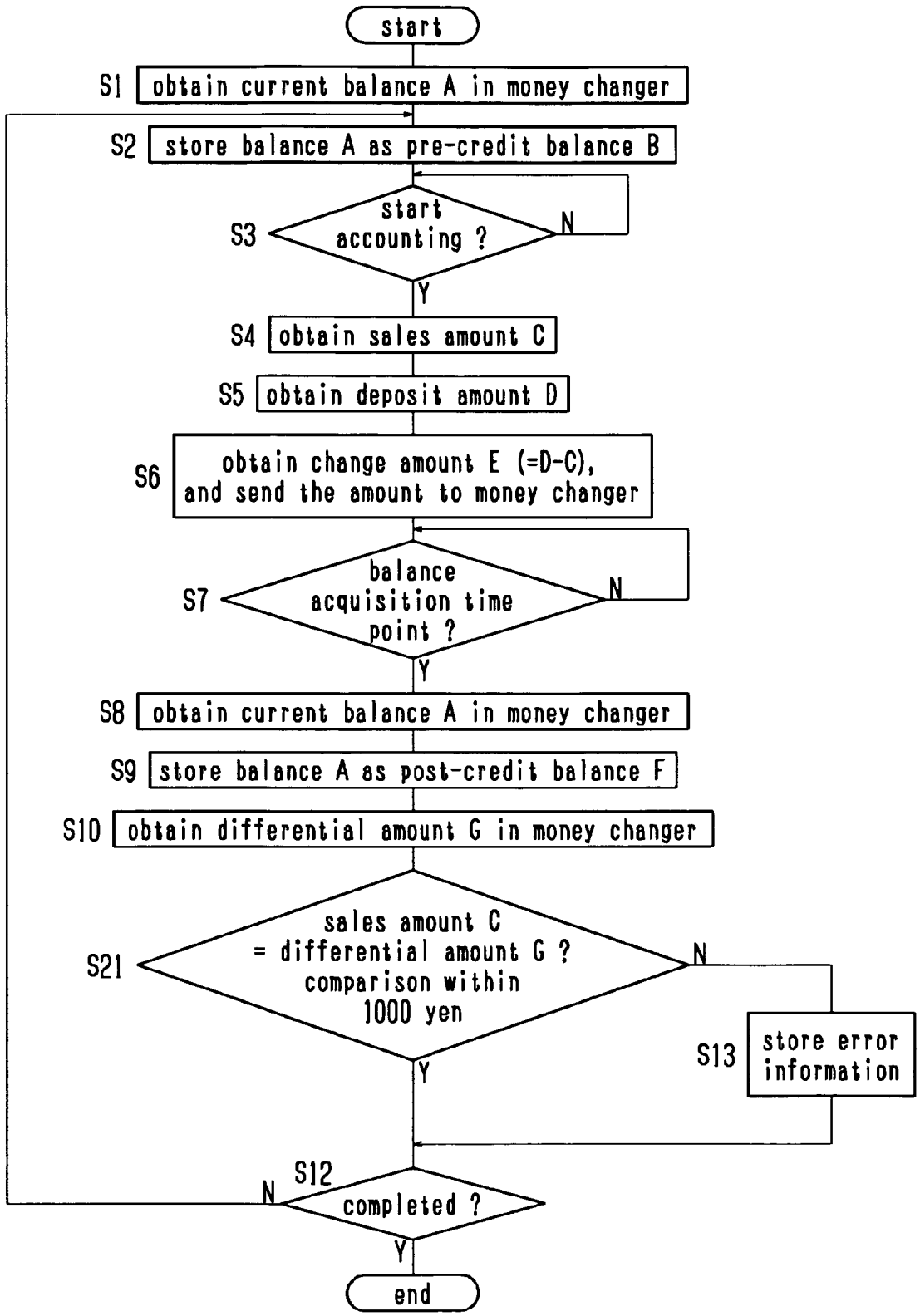
FIG. 8 is a flowchart showing another example of the sales processing flow.

FIG. 8 is a flowchart showing another example of the flow of sales processing. The sales processing in FIG. 8 is performed in the system configuration as shown in FIG. 7. The point differing from the sales processing in FIG. 6 is that step S11 in FIG. 6 is replaced with step S21. In step S21, the sales amount C and the differential amount G are compared with each other in amounts less than that of a bill of a minimum denomination (1000 Yen in the embodiment), and it is determined whether or not they match each other. Accordingly, since the credit of an amount less than that of the minimum denomination bill (1000 Yen in the embodiment) can be checked, information on a transaction having a money receiving problem is stored while linked with the transaction date and time into the money reception error management file F2, so that the time of the occurrence of money receiving error can be specified. Thus even in cases where the money changer 2 handles only coins, the cause of money receiving error can be found.

Figure 9:
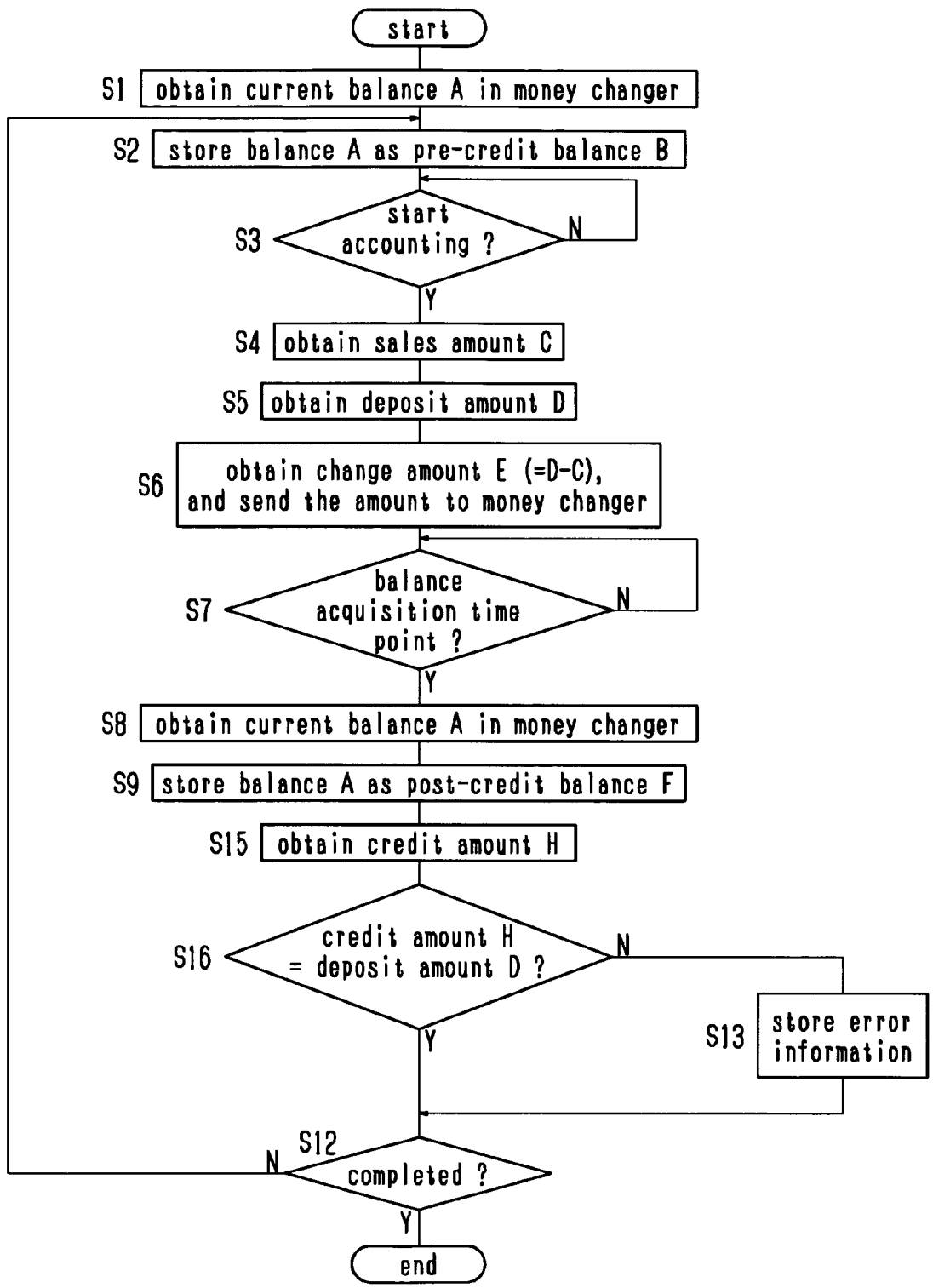
FIG. 9 is a flowchart showing another example of the sales processing flow.

FIG. 9 is a flowchart showing another example of the flow of sales processing. The sales processing in FIG. 9 is based on use of the system in FIG. 1. The sales processing in FIG. 9 can therefore be performed with a configuration similar to the system configuration for the sales processing in FIG. 6. The point differing from the sales processing in FIG. 6 is the process of finding the presence/absence of money receiving errors in FIG. 9. Hereafter, the difference from the sales processing in FIG. 6 will be described.

After the processing at steps S1 to S9 is complete, a credit amount H in the money changer 2 in the transaction is obtained (step S15, credit amount acquisition means). More particularly, the credit amount H is obtained as credit amount $H$=post-credit balance $F$−pre-credit balance $B$+change amount $E$.

Since the post-credit balance F is a balance after dispensing of change, the change amount E is added. Alternatively, the credit amount H may be obtained from the money changer 2.

The credit amount H is compared with the deposit amount D, input from the keyboard 32 as input means at step S5, and it is determined whether or not the credit amount H and the deposit amount D match each other (step S16).

If determined in step S16 that the credit amount H and the deposit amount D match each other (Y at step S16), the process proceeds to step S12 since there is no problem in the money receiving operation.

If determined at step S16 that the credit amount H and the deposit amount D do not match each other (N at step S16), since there is a problem in the money receiving operation, the process proceeds to step S13, and the error information is stored into the money reception error management file F2 (step S13). In this case, the date and time of the transaction, the transaction number, the cashier ID, the pre-credit balance B, the post-credit balance F, the differential amount G and the sales amount C, and further the credit amount H and the deposit amount D, are stored in the money reception error management file F2 as the error information. At this time, an area for storing the deposit amount D (not shown) may be added to the money reception error management file F2. The process then proceeds to step S12. Since information on a transaction having a money receiving problem is stored in the money receiving error management file F2 while linked with the transaction date and time, the time that the money receiving error occurred can be specified.

Figure 10:
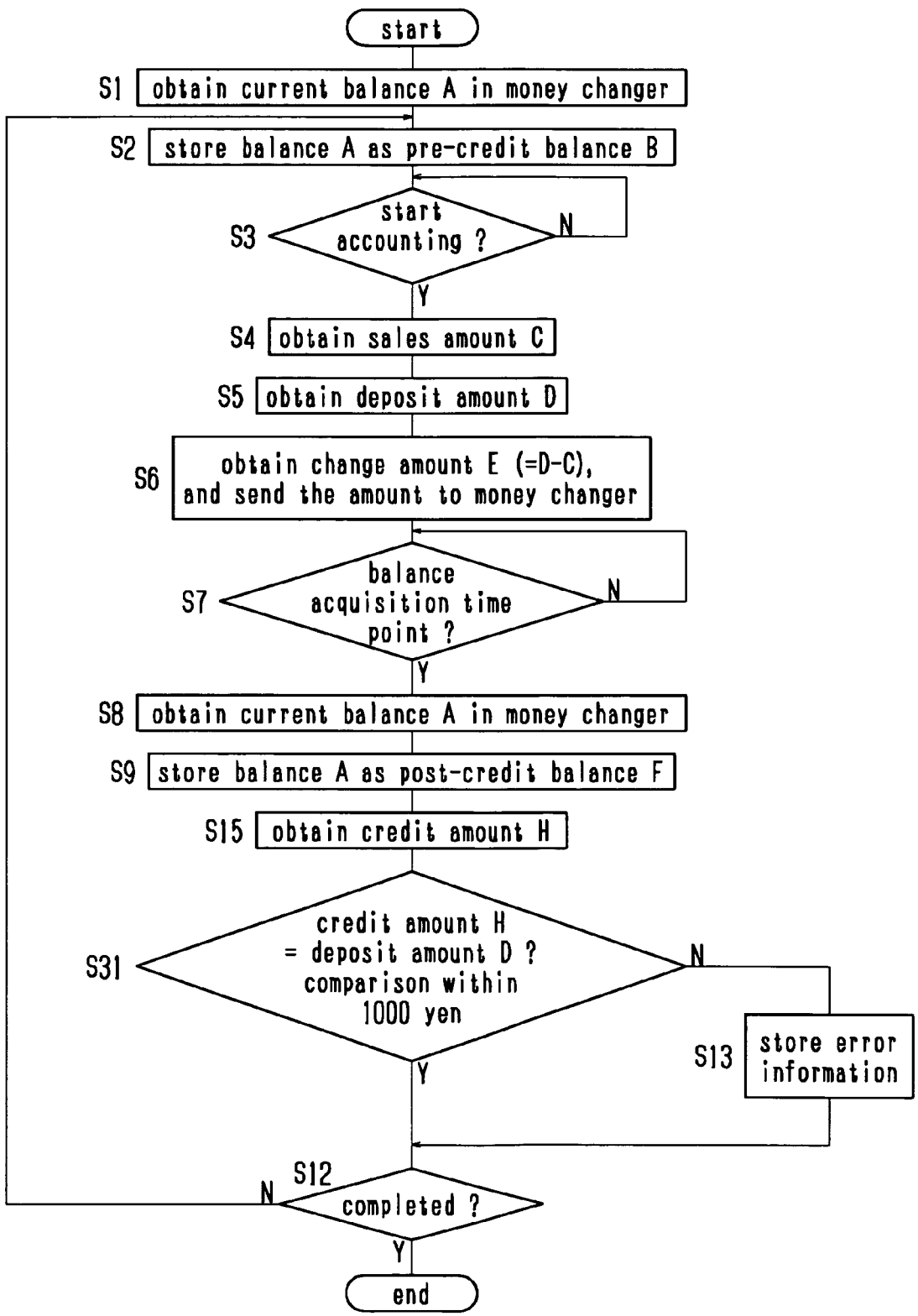
FIG. 10 is a flowchart showing another example of the sales processing flow.

FIG. 10 is a flowchart showing another example of the flow of sales processing. As in the case of the sales processing in FIG. 8, the sales processing in FIG. 10 is performed with the system configuration in FIG. 7. However, in the sales processing in FIG. 10, processing similar to that in the sales processing in FIG. 9 is performed to find if there money receiving errors. The point differing from the sales processing in FIG. 9 is that step S16 is replaced with step S31 in FIG. 10. In step S31, the credit amount H and the deposit amount D are compared with each other within amounts less than that of a minimum denomination bill (1000 Yen in the embodiment), and it is determined whether or not they match each other. Accordingly, since the credit of an amount less than that of the minimum denomination bill (1000 Yen in the embodiment) can be checked, information on a transaction having a money receiving problem is stored while linked with the transaction date and time into the money reception error management file F2, and the time that a money receiving error occurs can be specified. Therefore even in cases where the money changer 2 handles only coins, the cause of money receiving error can be found.

At steps S11, S16, S21 and S31 in FIGS. 6, 8, 9 and 10, if it is determined that the sales amount C and the differential amount G do not correspond with each other (N at step S11 and S21) or if it is determined that the credit amount H and the deposit amount D do not correspond with each other (N at step S16 and S31), then the process proceeds to step S13, in which the error information is stored. At the same time, notification is given with information that the sales amount C and the differential amount G do not match each other or the credit amount H and the deposit amount D do not match each other. The notification may be given by a display on the cashier display unit 34 or emission of a warning tone from a speaker installed in the POS terminal 1. The occurrence of a money receiving error can therefore be reported when it occurs. The notification of money receiving error effectively discourages the cashier from stealing the customer's deposit money, and therefore helps prevent crimes of this type.

Obviously, numerous modifications and variations of the present invention are possible in light of the above teachings. It is therefore to be understood that within the scope of appended claims, the invention may be practiced otherwise than as specifically described herein.

What is claimed is:

1. A merchandise sales data processing apparatus, comprising:
   means for executing merchandise sales processing;
   means for executing data communication with a money changer which automatically dispenses change;
   means for obtaining a sales amount in the sales processing executed in a transaction;
   means for obtaining a differential amount in the money changer occurred in the transaction based on information obtained by the data communication with the money changer;
   means for obtaining determination whether or not the obtained sales amount and the obtained differential amount match each other; and
   means for acquiring a transaction date and time on the transaction and storing the transaction date and time into a memory if the determination results show that the sales amount and the differential amount do not match each other.

2. The merchandise sales data processing apparatus according to claim 1, wherein a transaction number of the transaction is stored in the memory with the transaction date and time.

3. The merchandise sales data processing apparatus according to claim 1, wherein an information specifying the cashier who performed the transaction is stored in the memory with the transaction date and time.

4. The merchandise sales data processing apparatus according to claim 1, wherein a pre-credit balance in the money changer is stored in the memory with the transaction date and time.

5. The merchandise sales data processing apparatus according to claim 1, wherein a post-credit balance in the money changer is stored in the memory with the transaction date and time.

6. The merchandise sales data processing apparatus according to claim 1, wherein the differential amount is stored in the memory with the transaction date and time.

7. The merchandise sales data processing apparatus according to claim 1, wherein the sales amount is stored in the memory with the transaction date and time.

8. The merchandise sales data processing apparatus according to claim 1, wherein the determination is performed on amounts smaller than a minimum denomination paper currency.

9. The merchandise sales data processing apparatus according to claim 1, further comprising means for reporting the mismatch if the determination result shows that the sales amount and the differential amount do not match each other.

10. The merchandise sales data processing apparatus according to claim 1, wherein the differential amount is found as a difference between the pre-credit balance and the post-credit balance in the money changer acquired by the data communication with the money changer.

11. A merchandise sales data processing apparatus, comprising:
    means for executing merchandise sales processing;
    means for executing data communication with a money changer which automatically dispenses change;
    means for entering a deposit amount in the transaction;
    means for obtaining a credit amount to the money changer in the transaction based on information acquired by the data communication with the money changer;
    means for obtaining a determination whether or not the input deposit amount and the obtained credit amount match each other; and
    means for acquiring a transaction date and time, and storing the transaction date and time into a memory if the determination results show that the deposit amount and the credit amount do not match each other.

12. The merchandise sales data processing apparatus according to claim 11, wherein a transaction number of the transaction is stored in the memory with the transaction date and time.

13. The merchandise sales data processing apparatus according to claim 11, wherein an information specifying the cashier who performed the transaction is stored in the memory with the transaction date and time.

14. The merchandise sales data processing apparatus according to claim 11, wherein a pre-credit balance in the money changer is stored in the memory with the transaction date and time.

15. The merchandise sales data processing apparatus according to claim 11, wherein a post-credit balance in the money changer is stored in the memory with the transaction date and time.

16. The merchandise sales data processing apparatus according to claim 11, wherein a differential amount in the money changer occurred in the transaction is stored in the memory with the transaction date and time.

17. The merchandise sales data processing apparatus according to claim 11, wherein a sales amount in the sales processing executed in a transaction is stored in the memory with the transaction date and time.

18. The merchandise sales data processing apparatus according to claim 11, wherein the determination is performed on amounts smaller than a minimum denomination paper currency.

19. The merchandise sales data processing apparatus according to claim 11, further comprising means for reporting the mismatch if the determination result shows that the sales amount and the differential amount do not match each other.

* * * * *